July 29, 1930. O. W. KLINGSICK 1,771,758
ELECTRIC LIGHTING FIXTURE FOR SHOW CASES AND THE LIKE
Filed April 21, 1927
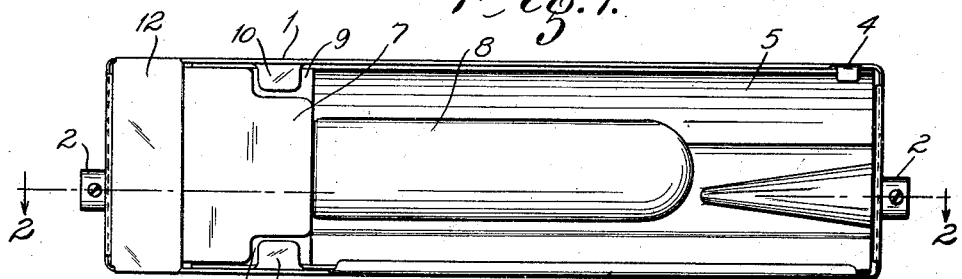
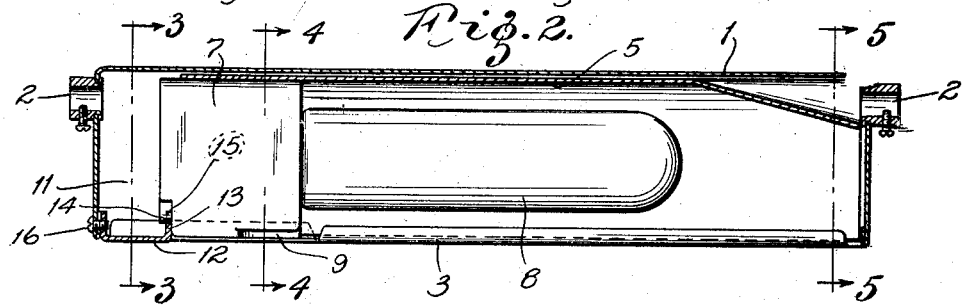
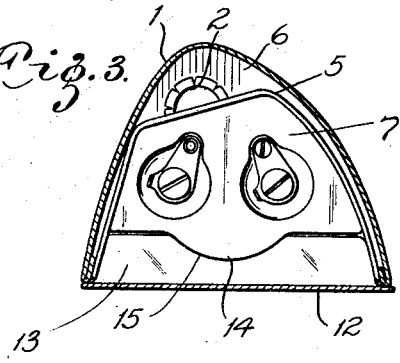
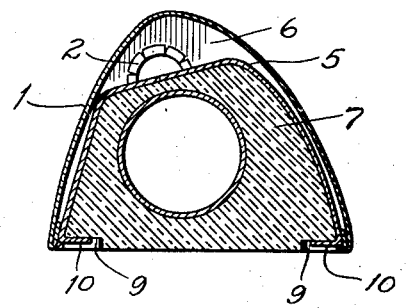
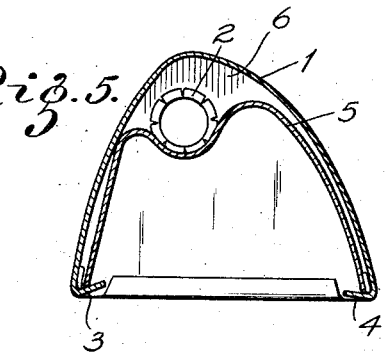
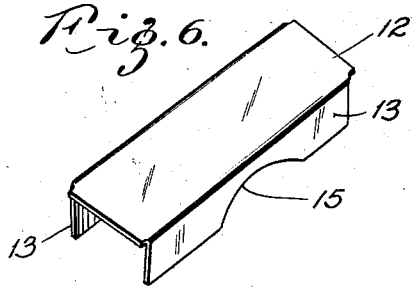
INVENTOR:
Oswald W. Klingsick
by Carr Hare & Gravely
HIS ATTORNEYS Patented July 29, 1930

1,771,758

UNITED STATES PATENT OFFICE

OSWALD W. KLINGSICK, OF ST. LOUIS, MISSOURI, ASSIGNOR TO DAY-BRITE REFLECTOR COMPANY, OF ST. LOUIS, MISSOURI, A CORPORATION OF MISSOURI

ELECTRIC LIGHTING FIXTURE FOR SHOW CASES AND THE LIKE

Application filed April 21, 1927. Serial No. 185,455.

My invention relates to electric lighting fixtures for show cases and the like and has for its object a fixture that is simple in construction, neat and ornamental in appearance, easy to assemble and disassemble and in which the wiring is concealed but easily accessible for inspection. The invention consists in the electric lighting fixture and in the parts and combinations and arrangements of parts hereinafter described and claimed.

In the accompanying drawing, wherein like reference characters indicate like parts wherever they occur, Fig. 1 is a bottom plan view of an electric lighting fixture embodying my invention;

Fig. 2 is a longitudinal sectional view on the line 2—2 in Fig. 1;

Figs. 3, 4 and 5 are cross-sectional views on the lines 3—3, 4—4 and 5—5 in Fig. 2 respectively; and Fig. 6 is a detail view of the cover member for concealing the electric wiring in the end of the fixture.

A trough member 1 adapted to be mounted in a show case or the like is provided with rings 2 in its ends through which electric wiring may extend. The trough member 1 is provided with a flange 3 extending along the outer portion of one of its edges and with a securing tongue 4 at the end of its other edge.

Disposed in the trough member 1 with one edge resting in said elongated flange 3 and with the end portion of its other edge engaged by said securing tongue 4 is a reflector member 5 that is similar in cross-sectional shape to the trough; but does not extend to the bottom of the trough whereby a channel 6 extending lengthwise of the trough is provided for electric wiring. The reflector member 5 is shorter than the trough member 1. In order to position it, the reflector member 5 is inserted in the trough 1 with its end spaced a slight distance away from the securing tongue 4 of the trough member, the edge of the reflector member is inserted in the elongated edge flange 3 of the trough member and the reflector member swung into position in the trough and finally the reflector member is moved endwise so as to abut against the end of the trough member and so that its edge portion is engaged by the securing tongue 4 of the trough member.

Mounted in the end of the reflector member 5 that is spaced away from the end of the trough 1 is a socket member 7 of porcelain or other suitable insulating material that is adapted to receive an electric light bulb 8. Said socket member 7 conforms in cross-sectional shape to the reflector member 5, thereby bracing the reflector member and making it easy to secure the socket member in position therein. Said socket member 7 is adapted to be slipped endwise into the reflector member 5 before the reflector is placed in the trough; and the socket member is provided with marginal recessed or rabbeted end edge portions 9 into which extend inwardly bent fingers 10 along the edges of the reflector member 5. Thus the socket member is secured in the reflector member without the use of screws and the like and may be easily removed therefrom.

The space 11 between the socket member and the end of the trough member constitutes a pocket that is adapted to receive electric wiring. This pocket 11 is closed by a cover 12 that has depending side walls 13 that abut against the end of the trough member and the end of said socket member 7 respectively. Preferably said socket member 7 has a projecting rounded portion 14 which fits in a corresponding concave seat 15 in one wall of the cover member 12. The cover member 12 is secured in position as by a screw 16 extending through the end of the trough member and a wall 13 of said cover member.

The above described fixture has numerous advantages. It is simple in construction, comparatively inexpensive to make and easily assembled and disassembled. The electric wiring is concealed but is easily accessible. Obviously numerous changes may be made without departing from the invention and I do not wish to be limited to the precise construction shown.

What I claim is:

An electric lighting fixture comprising a trough member, a reflector member therein terminating short of one end of the trough thereby forming a pocket, a socket member in the end of said reflector member, a cover for said pocket between the end of said reflector member and the end of said trough, said cover having depending portions abutting against the ends of said socket member and said trough member respectively and a securing screw passing through said end of said trough member and the adjacent depending portion of said cover.

Signed at St. Louis, Missouri, this 18th day of April, 1927.

OSWALD W. KLINGSICK.